United States Patent
Wada et al.

(10) Patent No.: US 6,952,819 B1
(45) Date of Patent: Oct. 4, 2005

(54) BASIC-ADMINISTRATIVE-TASKS SOFTWARE PROGRAM AND A METHOD OF SELLING SAME

(75) Inventors: Shigefumi Wada, Tokyo (JP); Shigeru Nakayama, Tokyo (JP); Shigekazu Kurozu, Tokyo (JP); Tomohisa Takahashi, Tokyo (JP)

(73) Assignee: Obic Business Consultant Co., Ltd., Tokyo (JP)

( * ) Notice: Subject to any disclaimer, the term of this patent is extended or adjusted under 35 U.S.C. 154(b) by 409 days.

(21) Appl. No.: 09/667,802

(22) Filed: Sep. 22, 2000

(30) Foreign Application Priority Data

Jan. 13, 2000 (JP) .............................. 2000-004643

(51) Int. Cl.[7] .............................................. G06F 9/44
(52) U.S. Cl. .......................... 717/123; 705/8; 707/102
(58) Field of Search ................................ 717/106, 107, 717/120, 123; 705/1, 7–9; 707/102, 104.1; 715/509

(56) References Cited

OTHER PUBLICATIONS

Navison Financial, 1998, "http://web.archive.org/web/19980130114821/http://www.navision.com/", Navison Software (as archived by The Wayback Machine, http://www.archive.org).*

Great Plains Accounting, 2000, "http://web.archive.org/web/20000304025004/www.greatplains.com/accounting/modules_f.asp", Great Plains Software (as archived by The Wayback Machine, http://www.archive.org).*

* cited by examiner

*Primary Examiner*—Tuan Dam
*Assistant Examiner*—Eric B. Kiss
(74) *Attorney, Agent, or Firm*—Lowe Hauptman & Berner, LLP

(57) ABSTRACT

A computer-readable recording medium in which basic-administrative-tasks software programs are recorded, according to this invention provides a module for data-writing processing into a database in a manner so as to maintain compatibility of data between tables, even when customized data is included in a table. The module for writing data is equipped with both a data-writing processing functions group corresponding to the customization, and a writing means for simultaneously updating both a customizing region and a core region in the database memory on a disk.

9 Claims, 8 Drawing Sheets

A Processing Device Using the Basic-Administrative-Tasks Software Program

FIG.4

(1) Sales-Slip Data Writing Function (new sales slip)

New-registering function of a sales slip (a)

Kind of function (the number of an argument list is shown inside of the brackets)

|  | normal slip | relay slip | consumer-tax slip |
|---|---|---|---|
| Case where columns are added to both the head part and details part of the slip. | D04_ERP_Wrt1 [①②③④⑤⑥⑦⑧⑨⑩] | D04_ERP_RelayWrt1 [same as left] | D04_ERP_TaxWrt1 [①②③④⑤⑦⑧⑨⑩] |
| Case where columns are added to only the head part of the slip. | D04_ERP_Wrt2 [①②③④⑤⑥⑦⑩] | D04_ERP_RelayWrt2 [same as left] | D04_ERP_TaxWrt2 [①②③④⑤⑦⑩] |
| Case where columns are added to only to only the details part of the slip. | D04_ERP_Wrt3 [①②③⑥⑦⑧⑨⑩] | D04_ERP_RelayWrt3 [same as left] | D04_ERP_TaxWrt3 [①②③⑦⑧⑨⑩] |
| Case where no columns are added. | D04_ERP_Wrt4 [①②③⑥⑦⑩] | D04_ERP_RelayWrt4 [same as left] | D04_ERP_TaxWrt4 [①②③⑦⑩] |

(2) List of the Group's Arguments

|  | argument | content | notes |
|---|---|---|---|
| ① | ByVal strDBNM As String | name of target database | hdt0001~hdt1000 |
| ② | ByVal intinpChk As Integer | whether the content of items not to require inputting is checked or not | 0: Yes  1: No |
| ③ | ByVal strOBC_H_Data As String | slip-head data |  |
| ④ | ByVal strH_Add_Data As String | slip-head additional data | To be set according to the information concerning the order and length of the argument ⑤ |
| ⑤ | ByRef udtH_Add_Form() As COLUM_FORM_W | a slip head/an additional style | Contents are COLUM_FORM_W × the number of additional columns |
| ⑥ | ByVal intMeiGyoSu As Integer | the number of writing detailed columns | 1~99 |
| ⑦ | ByVal strOBC_M_Data As String | sales-slip detailed head data |  |
| ⑧ | ByVal strM_Add_Data As String | slip-details additional data | To be set according to the information concerning the order and length of the factor ⑨ |
| ⑨ | ByRef udtM_Add_Form() As COLUM_FORM_W | slip details additional style | Contents are COLUM_FORM × the number of additional columns |
| ⑩ | ByRef udtRetData As RET_DATA | for storing the serial number and the slip number of the registered slip | To be set on a DLL side at the time of normal slip registration |

FIG.5

(1) Sales-Slip-Registering Function (revision and deletion of sales slip)

Sales slip revision registering function (b)

Kind of function (inside of the bracket shows number of a argument list)

|  | normal slip | relay slip | consumer tax slip |
|---|---|---|---|
| Case where columns are added to both the head part and details part of the slip. | D04_ERP_ReWrt1 [①②③④⑤⑥⑦⑧⑨⑩] | D04_ERP_RelayReWrt1 [same as left] | D04_ERP_TaxReWrt1 [①②③④⑤⑦⑧⑨⑩] |
| Case where columns are added to only the head part of the slip. | D04_ERP_ReWrt2 [①②③④⑤⑥⑦⑩] | D04_ERP_RelayReWrt2 [same as left] | D04_ERP_TaxReWrt2 [①②③④⑤⑦⑩] |
| Case where columns are added to only to only the details part of the slip. | D04_ERP_ReWrt3 [①②③⑥⑦⑧⑨⑩] | D04_ERP_RelayReWrt3 [same as left] | D04_ERP_TaxReWrt3 [①②③⑦⑧⑨⑩] |
| Case where no columns are added. | D04_ERP_ReWrt4 [①②③⑥⑦⑩] | D04_ERP_RelayReWrt4 [same as left] | D04_ERP_TaxReWrt4 [①②③⑦⑩] |

(2) Argument list

|  | argument | contents | notes |
|---|---|---|---|
| ① ⟨ ⑨ | (same as the new registering function for a slip) | | |
| ⑩ | ByVal strTosiNo As Strings | serial number of a slip to be revised | Fixed at the length 10 |

(3) Sales slip deleting function (c)

Kind of function (inside of the bracket shows the number of a argument list)

|  | normal slip | relay slip | consumer-tax slip |
|---|---|---|---|
| all cases | D04_ERP_Del [①②] | D04_ERP_RelayDel [same as left] | D04_ERP_TaxDel [same as left] |

(4) Argument list

|  | argument | contents | notes |
|---|---|---|---|
| ① | ByVal strDBNM As String | name of target database | hdt0001~hdt1000 |
| ② | ByVal strTosiNo As String | the serial number of the slip to be revised | Fixed at the length 10 |

FIG.6

Sales-slip--- Head Data Required for Initial Entry or Revision of Sales-slip (set in the argument ③)

A. Data related to setting (set at a front of the header data)

*set only at the time of new registration (started from B at the time of revision)

|   | item | setting contents | length |
|---|---|---|---|
| 1 | system number(setting) | 0: not exist 1: exist | 1byte |
| 2 | slip number(setting) | 0:month's serial number 1:year's serial number 2:manual input | 1byte |
| 3 | serial number information writing | 0:Yes 1:No | 1byte |

B. Header data(A is set at the front at the time of new registration)

|   | item | setting contents | length |
|---|---|---|---|
| 1 | slip division | 0: charge sales 1: cash sales 2: credit | 1byte |
| 2 | sales date | year, month, and day are set by 2 digits | 6byte |
| 3 | bill date | year, month, and day re set by 2 digits | 6byte |
| 4 | slip number | 0 is set when the slip number does not exist | 6byte |
| 5 | customer code | codes which does not omitted for displaying | 13byte |
| 6 | customer information (notification of the tax amount) | 0: detailed part unit 1: bill unit 2:tax free 3:slip unit | 1byte |
| 7 | code of person in charge | 4 digits, space when it is not set | 4byte |
| 8 | abstract name/spot customer name | A spot customer name is set when the customer code is "0000000000000". | 30byte |
| 9 | code of credit company | To be set when the slip division is "2:credit", otherwise spaced | 4byte |
| 10 | user name | "domain name¥user name" or "computer name¥user name" | 36byte |

FIG.7

Sales-slip---Detailed Data Required for Initial Entry or Revision of Sales-slip Data (set in argument ⑦)

C. detailed data (set in a form to be repeated by the number of detailed columns)

| | item | setting contents | length |
|---|---|---|---|
| 1 | sales division | 0:sales 1:return 2:discount 3:incidental sales 4:incidental expenses 5:fare 6:abstract 7:consumer tax | 1byte |
| 2 | merchandise code | codes not omitted for displaying | 13byte |
| 3 | merchandise name | | 36byte |
| 4 | tax division | 0:(tax exemption) 1-9 | 1byte |
| 5 | taxation division | 0: tax exclusive 1: tax inclusive | 1byte |
| 6 | decimal digits of quantity | 0~3 | 1byte |
| 7 | decimal digits of unit price | 0~2 | 1byte |
| 8 | warehouse number | _0 or space when the warehouse is not set | 4byte |
| 9 | order number | only 0 is not allowed | 9byte |
| 10 | arrival number | only whole numbers, 0 is regarded as not inputted | 4byte |
| 11 | box number | only whole numbers, minus is allowable, 0 is regarded as not inputted, and setting is impossible when the arrival number is not inputted | 5byte |
| 12 | quantity | quantity does not require setting when the arrival number and the box number are set ([11]×[12] is applied), minus is allowable, and to be inputted by within 8 digits in total including [6.decimal digit of quantity] | 8byte |
| 13 | unit | | 4byte |
| 14 | unit price(=sales unit price) | space is regarded as 0, and to be inputted by within 9 digits in total including [7.decimal digits of unit price] | 9byte |
| 15 | unit cost(=sales cost) | space is regarded as 0, and to be inputted by within 9 digits in total including [7.decimal digits of unit price] | 9byte |
| 16 | sales figure(=sales detailed figure) | [12]×[14] is applied when it is spaced, only whole numbers, and minus is allowable | 9byte |
| 17 | sales cost(=cost detailed figure) | [12]×[15] is applied when it is spaced, only whole numbers, and minus is allowable | 9byte |
| 18 | consumer tax | space is regarded as 0, only whole numbers, and minus is allowable | 8byte |
| 19 | simultaneous processing flag | space/0:not to be simultaneously processed, 1:simultaneous arrival, 2: simultaneous production | 1byte |

FIG. 8

Application Program for Writing a Database

```
Public Declare Function DO4_ERP_Wrt1 Lib "DO4ERP.dll" ( _
                       ByVal strDBNM As String, _
                       ByVal intInpChk As Integer, _
                       ByVal strOBC_H_Data As String, _
                       ByVal strH_Add_Data As String, _
                       ByRef udtH_Add_Form() As COLUM_FORM_W, _
                       ByVal intMeiGyoSu As Integer, _
                       ByVal strOBC_M_Data As String, _
                       ByVal strM_Add_Data As String, _
                       ByRef udtM_Add_Form() As COLUM_FORM_W, _
                       ByRef udtRetData As RET_DATA) As Integer
```

Structure for storing information of additional columns

```
Public Type COLUM_FORM_W
    StrName As String * 129     ' column name of the data
                                  (terminal null characters are added)
    IntSQLModel As Integer      ' type of the data
    IntSize As Integer          ' size of the data (fixed length)
End Type
```

Structure for storing the information after new registration

```
Public Type RET_DATA
    StrTosiNo As String * 11    ' serial number (terminal null characters are added).
    StrDno As String * 7        ' slip number (end terminal null characters are added)
End Type
```

BASIC-ADMINISTRATIVE-TASKS SOFTWARE PROGRAM AND A METHOD OF SELLING SAME

BACKGROUND OF THE INVENTION

1. Field of the Invention

This invention relates to a computer-readable recording medium in which basic-administrative-tasks software types are recorded, and said program which can be immediately used after they are installed in terminals of a computer system equipped with a database for processing company's basic-administrative-tasks and a plurality of terminals which can load a task processing software program.

2. Description of the Prior Art

There are certain common basic administrative tasks that must be performed by all companies, even though the types of business of the companies differ. Such basic tasks include, for example: accounting tasks relating to income and expenditures, such as costs associated with doing business; sales/purchases-related tasks for recording and managing data concerning the sales of the company's products or services, customers to which merchandise or services are provided, and purchase orders to suppliers from which materials or services are obtained; and worktime/wages-related tasks involved in managing wage calculations and payments to the company's employees.

The aforementioned basic tasks of companies have enormously high commonality with regard to the items to be recorded and managed by each company, as well as to the methods of processing such items, even though the business styles or business fields of the companies differ. Such basic tasks account for most of the processing work of a company, and they are performed every day, week after week and month after month. Therefore, such basic tasks are especially suitable for the mass-processing, precision, and speediness that is possible by using computers.

The present basic-administrative-tasks software programs (basic-tasks programs) comprise a graphical user interface (GUI) and a relational-database management system that has a high-speed searching/sorting function for keeping up with the progress of a personal computer and the computer's operating system. The subject program also is capable of being used with a network, which is the usual circumstance when a company's resource data is being prepared.

Because the basic-administrative-tasks software programs are developed by a software company whose personnel who are professionals in such fields as financial accounting, wage calculation, sales/purchases management, and systems engineering, it is designed to be ideal for processing a user-company's basic tasks. Use of such an ideal task-management program can improve the management of companies, particularly small and medium-size companies, which often experience difficulty in securing personnel, and venture companies that are involved in starting up new businesses.

However, prior basic-administrative-tasks software programs have had problems in that they could not cover either special management items that correspond to specific business fields or management items and methods for realizing a novel tasks-management means based on management concepts that differ among companies. Therefore, the utilization of basic-administrative-tasks software programs has been limited to companies having a history of applying their own management systems. In order to develop the application programs into which such a company's unique management system can be integrated, a large amount of money and period have been required, because development steps such as analysis of the existing system, design of a new overall system, detailed design of a database and processing procedures, programming, and testing and debugging have been needed. Also, small and medium-size companies have had additional difficulties in that a longer period of development and higher costs were required for such companies, because they had to contract out the development work to outside software-developing companies, inasmuch as such companies could not secure professionals such as system engineers and programmers, and hence the development work could not be done within the company.

To solve the above-mentioned problems, it is necessary for basic-administrative-tasks software programs to serve as basic programs that can perform a company's basic administrative tasks in order to achieve their intended effects, but also for the program to be such that there can be developed and operated a separate application program for processing additional data in a way that is compatible with the processing of the company's data by the basic-administrative-tasks software programs.

However, because the basic database and other features of the prior basic-administrative-tasks software programs could not be customized to be compatible with the application programs that were developed by companies to handle their unique requirements, the use and value of such basic-administrative-tasks software programs were severely limited.

SUMMARY OF THE INVENTION

This invention has been created in view of the above-mentioned problems. Its objectives are to provide a computer-readable recording medium in which customizable basic-administrative-tasks software programs are recorded, the customization rules of which are publicized, and to enable sales of the above-mentioned computer-readable recording medium to companies and distribution of the customized application in the market.

For the purpose of solving the above-mentioned problems, the present invention provides:

a computer-readable recording medium, in which plural basic-administrative-tasks software programs that are installed and operated in plural terminals of a computer system are recorded, and this computer system comprises at least plural terminals for processing basic-administrative-tasks, and a database device that stores company's resource data required for the tasks and is controlled by a database server computer, and said recording medium is characterized such that said computer-readable recording medium further comprises, in addition to a plurality of said basic-administrative-tasks software programs, a data-writing processing module that records:

a Dynamic Link Library (DLL) file, which stores a data-writing processing function group that corresponds to each table in order to create a database writing application program that can correspond to either of the customized or noncustomized conditions according to each table unit of basic-tasks programs at the time of entering data into the table of a database by data-entry processing with the basic-tasks programs that are installed in said terminal computers, and a program file of a means for creating a primary dump file, in which a current table is automatically created when the basic-tasks programs are set up in order to create a new table that can perform customization by adding columns to an original table;

the means for creating a primary dump file automatically creates a default dump file including all of information on database relating to the tasks under a given filename in a given path of said server computer when said basic-tasks programs are set up in one of said terminal computers, and a new table for writing customized data is created by the created default dump file;

said data-writing processing function group divides tables into at least two conditions: the first condition being whether to or not to be custom written, and the second condition being whether the data being entered is new data, a revision of previously entered data, or a deletion of previously entered data, at the time of writing processing of said basic-tasks programs executed in each table, and is stored in the DLL file for each possible combination of the two conditions;

the function groups have respective arguments in which at least a target database name, data to be entered, a serial number, and an identification number are entered, and items for inputting the additional data and the style formats are formed to the arguments of the customized functions, and when a function corresponding to each table is called up and a required task processing data is set to the arguments as entry items, data is written to a target table in the arguments by the function;

if programs recorded in said computer-readable recording medium are installed to said terminal computer and a basic-tasks program desired to perform data-writing processing is set up, a default dump file is generated as an original table in a given path under a given filename;

when custom-writing is desired, customization is performed by creating a new table for writing customized data in another memory region different from that of the original table, and adding columns to the original table against the new table;

the data-writing processing function corresponding to said division is called up for each table of the basic-tasks program from the data-writing processing function group of said DLL file;

a data-writing processing application program is generated that can write sequential data for each table unit by batch processing, using a series of data-writing processing functions, to the arguments of which required basic-tasks processing data is entered respectively; and the data-writing processing application program is operated by said terminal computer, and when the original column of each table and the customized table are used, the data of the customized columns are sequentially written for each table, and the basic-tasks programs are batch processed.

Plural terminals are provided, and said module for writing data for maintaining the matching of data in the simultaneously executed entries includes a simultaneous-executions control program for performing exclusive control of each execution unit.

Said basic tasks includes at least any one of the following: accounting tasks, sales/purchases-related tasks, and worktime/wages-related tasks.

The company's resource data that is stored in said group of databases comprises a group of master tables and a group of data tables required for executing at least any of three administrative tasks: accounting tasks, sales/purchases-management tasks, and worktime/wages-related tasks. Said group of master tables comprises at least any of the following tables for a company's basic list of master files: a master list of account titles, a master list of customers, a master list of merchandise, and a master list of personnel, and said data-table group comprises at least tables for a variety of slip data, such as data from accounting-journal slips, sales slips, and purchase slips.

A retailer adds columns or new tables to original tables if a user-company uses a computer system and requests customization of the tasks-related databases, accesses the data-writing processing function corresponding to the customized conditions, including conditions as to whether new data is being entered, previously entered data is being revised, or previously entered data is being deleted from said data-writing processing functions group on the basis of the specific task of said various data entry/processing operations, enters the name of a writing-target database, the basic data to be entered, a serial number, an identification number, additional data, and a style format for the additional data in terms of the arguments of the selected function, and generates an application program for writing, by batch processing, to the database according to the table unit. The application program is sold by a plurality of retailers as an attachment to the basic-tasks program.

With the method for selling the basic-tasks program or a module for writing data, a user-company or its retailer collects information relating to applications developed by performing customization, stores that information in a database, and publicizes that information on the software company's Website. Such information can be accessed from said database when another user-company wants to perform similar customization.

A computer-readable recording medium recorded basic-administrative-tasks software programs, is characterized such that said recording medium is equipped with, in addition to a plurality of said basic-tasks programs and data-writing processing module, a data-accepting processing module, which stores a data-accepting processing function group corresponding to each table in a DLL file, in order to generate a database writing application program that compatibly operates with both customized and nondustomized conditions according to the table unit of the basic-tasks programs when a general-purpose data, namely a text data is read in the table of the database from the outside of said terminal computer with the basic-tasks programs that are installed to said terminal computer and the general-purpose data is accepted in the table of said database;

said data-accepting processing function group is divided and entered in the DLL file according to whether each table for writing a text file of the external general-purpose data has at least additional customized columns or not, when the data is accepted from the outside of the said basic-tasks programs for each table unit;

each function group has arguments, which have at least a target database name, a full path to a text file of the external general-purpose data, a full path of a log file creating target, a slip number, and an identification number as entry items, and also when columns are added to the data of the text file, a format for entering it is created as an entry item, such an application can be created that writes the data to a writing target table from the general-purpose text file with the function by batch processing, when the function corresponding to each table of the general-purpose data is called up and the required basic-tasks processing data is set into the entry items of the arguments;

to accept said external general-purpose text data in the database, the data is firstly set into a hard-disk drive or a floppy-disk drive of the terminal computer, in which basic-task programs recorded in said computer-readable recording medium are installed;

a data-accepting processing function corresponding to the customized condition of the basic-tasks program is called up for each table from the data-accepting processing function group of said DLL file using the terminal computer;

a data-accepting processing application program that can sequentially accept the data for each table unit is created using a series of the data-accepting processing functions, to the arguments of which required basic-tasks processing data is entered respectively;

the data-accepting processing application program is operated by said terminal computer, the data is sequentially accepted and written via the data-accepting processing function from the hard-disk drive or the floppy-disk drive that records the external general-purpose text data, to which the data of an original column and the data of a customized column of said writing target database are set for each table.

A user-company's retailer selects the data-accepting function corresponding to the customized conditions that apply when a user-company uses a computer system and wants to enter general-purpose data into the database from the terminal, writes at least the name of the target database, the full path to the text file of the general-purpose data, an identification number, and the format of the additional columns at the time of being customized in the arguments of the accepting function. The retailer then creates and tests an application batch program that is then sold at a plurality of retailers as an attachment to the basic-tasks program.

Said user-company or its retailer collects the information about the application program that was developed by customization, stores that information in a database, and publicizes that information on the software company's Website. That information can be accessed from said database when another user-company wants to perform a similar customization.

DESCRIPTION OF THE DRAWINGS

The present invention is illustrated by way of example, and not by limitation, in the figures of the accompanying drawings, wherein elements having the same reference numeral designations represent like elements throughout and wherein:

FIG. 4 (1) shows a sales-slip data-writing processing functions group (in the case of a new sales slip to be entered/registered) of the present invention and (2) shows a list of the group's arguments;

FIG. 5 (1) shows a sales-slip functions group (in a case of data being revised or deleted), (2) shows a list of the group's arguments, (3) shows the sales-slip deletion function and (4) shows a list of the sales-slip functions group's arguments;

FIG. 6 shows one embodiment of sales-slip-head data required for initial entry/registration or revision of sales-slip data;

FIG. 7 shows one embodiment of sales-slip detailed data required for initial entry/registration or revision of sales-slip data; and FIG. 8 shows one embodiment of an application program for database writing by using the data-writing processing function of the present invention.

THE DETAILED DESCRIPTION OF THE INVENTION

The Embodiment of the Invention

Figure 1:
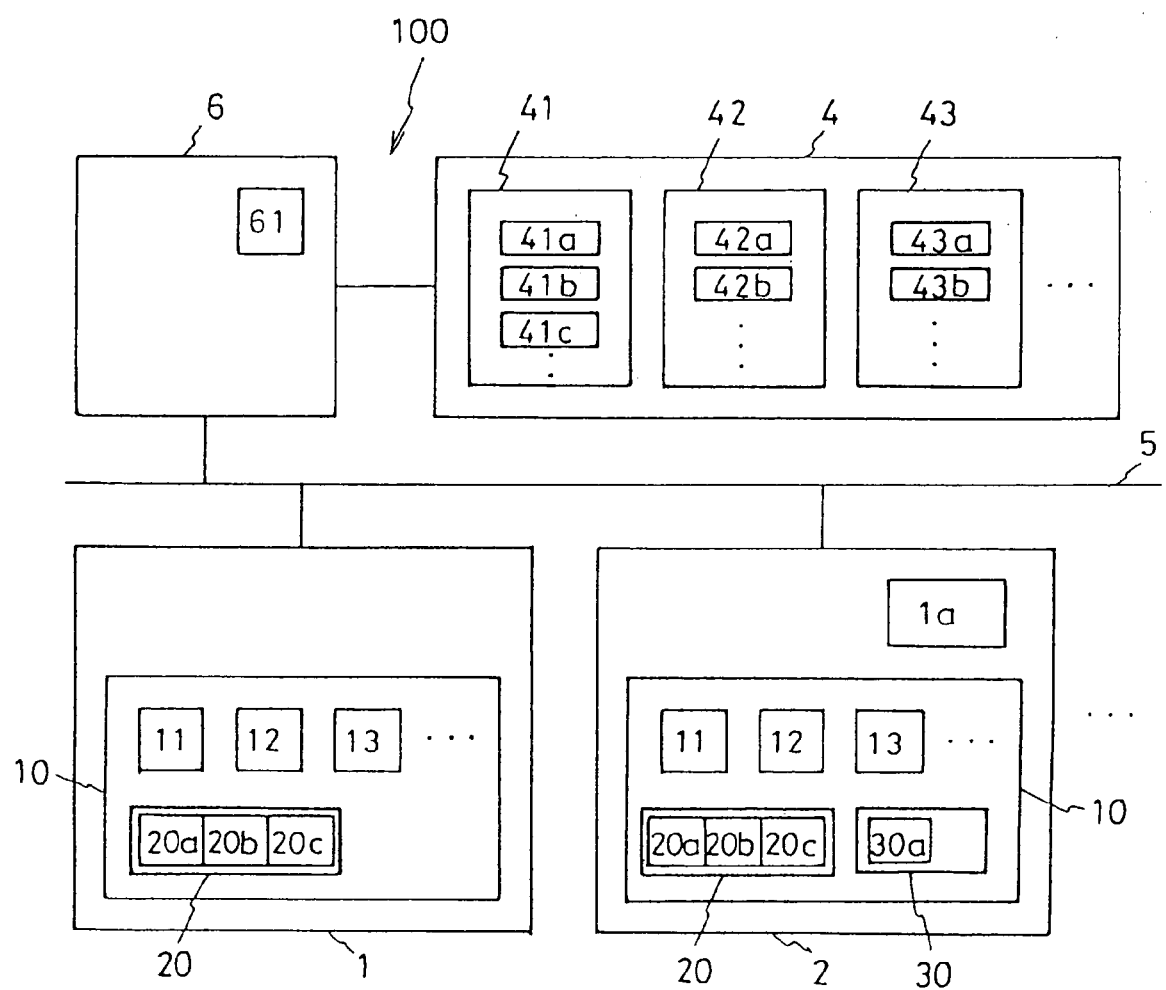
FIG. 1 is a block diagram of one embodiment of the present invention, showing a basic-tasks processing device using basic-administrative-tasks software programs recorded in a computer-readable recording medium.

FIG. 1 is a block diagram of one embodiment of the present invention, showing a basic-tasks processing device 100 (a computer system of a user-company) that is operated using basic-administrative-tasks software programs in a computer-readable recording medium in which basic-administrative-tasks software programs are recorded 10. FIG. 1 also shows computer terminals 1 and 2, a database-storage processing device 4, a local area network (LAN) 5, and a server computer 6.

Computer terminals 1 and 2 are controlled by a commercial operating system (OS) and basic-administrative-tasks software programs recorded in the computer-readable recording medium 10 are installed and operated by the operating system, as shown in FIG. 1.

In the embodiment of the present invention, the recording medium 10 includes at least a sales/purchases-tasks program 11, a financial-accounting-tasks program 12, and a worktime/wages-related tasks program 13, as well a customizable data-writing processing module 20 of a following readable recording medium, in which programs are recorded, that ensures that data being input from a computer terminal 1 will be compatible with the tables of the databases into which the data is being input and that are stored in the database-storage processing device 4.

The data-writing processing module 20 comprises data-writing functions group 20a which is stored in a DLL file, that corresponds to each of the task programs to be operated under either customized or noncustomized conditions; a simultaneous-executions limiting means 20b, for maintaining compatibility in the case of simultaneous executions by each table unit; and a primary dump-file-creating means 20c that, at the time of starting up of a task program, automatically creates, under a given filename, a default dump file that will include all of the information contained in the database related to the task in a given path of the server computer.

In addition to the computer terminal 1, there is a computer terminal 2 that is equipped with a data-accepting processing module 30 for accepting general-purpose data (text data).

The data-accepting processing module 30 is equipped with at least a data-accepting processing functions group 30a corresponding to both the customized and noncustomized conditions, depending on the particular table unit.

A hard-disk drive or floppy-disk drive reads general-purpose data, namely text data, that is being input, and the data is stored on applicable hard disk or floppy disk 1a.

A database group in the database-storage processing device 4 is controlled by a database-device control program 61 in the database server computer 6.

In such a case, tables 41a, 41b, and so on are contained in a sales/purchases database 41; tables 42a, 42b, and so on are contained in an accounting database 42; and tables 43a, 43b, and so on are in a worktime/wages-related database 43.

There also can be provided other task-management database groups in addition to the task-management databases 41, 42, and 43. In such a case, a data-writing processing function that is appropriate for the additional tasks program(s) is added to the data-writing processing functions group 20a.

Next, the operation of the computer-readable recording medium in which basic-administrative-tasks software programs are recorded 10, of the present invention using the basic-tasks processing device 100 will be described, based on the flowchart in FIG. 2.

Figure 2:
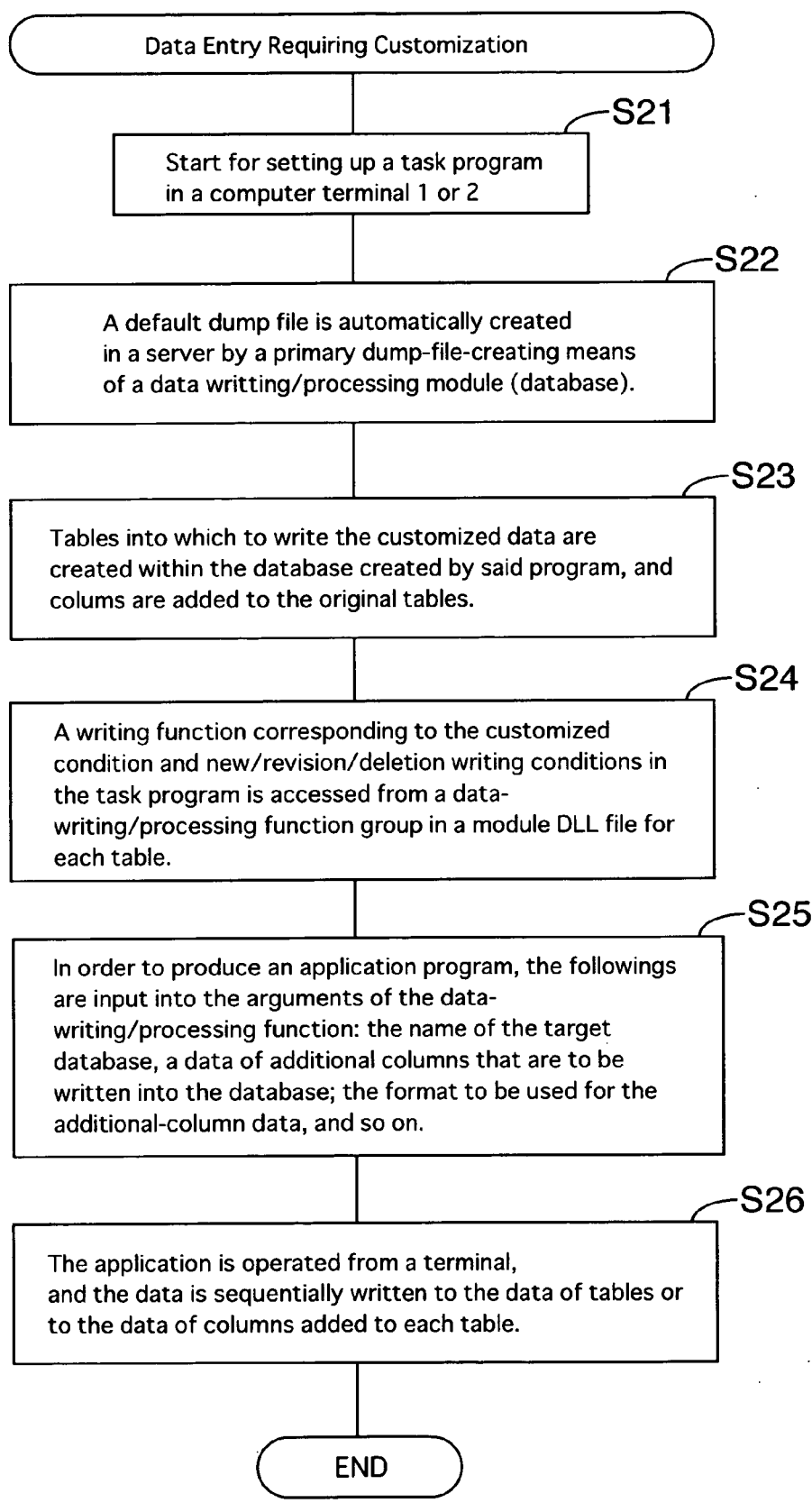
FIG. 2 is a flowchart showing data entry requiring customization with a module for writing data of the present invention.

Referring now to FIG. 2, first will be described the data-entry process using a computer terminal 1 or 2 in a case where the computer-readable recording medium in which basic-administrative-tasks software programs are recorded 10, is equipped with the data-writing processing module 20.

The tasks program 11, 12, 13 for performing a company's basic tasks that are to be executed is launched at step S21). At that time, the primary dump-file creating means 20c of the data-writing processing module 20a creates, under a given filename, a default dump file in a given path of the database-storage processing device 4 in the server computer 6 at step S22.

Then, at step S23 the table 41a, 42a, 43a of a database comprising the default dump file is generated as an original table in a core memory region, and the table 41b (42b) (43b) of a database V for writing customized data is generated in a region other than a memory region. Also, customization is performed by adding columns for customized-writing to the table for writing, when customization is processed in the table 41b (42b) (43b) for writing.

At step S24, the tasks program 11, 12, 13, the data-writing processing functions group that corresponds to the customized or noncustomized conditions, along with any condition(s) relating to the entry of new data or to the revision or deletion of existing data, are accessed by each table from the data-writing processing functions group 20a in a DLL file of the data-writing processing module 20.

At step S25, next the name of the target database, an entry-data serial number, an identification number, additional-columns data, the style format of the additional-columns data, and the like are input in arguments of the data-writing processing functions group 20a, and an application program for batch processing the writing of each table is created.

At step S26 the application program is operated from the computer terminal 1, 2, and data is sequentially entered in the original-columns data and the additional-columns data of each table, or in a new table 41b (42b) (43b) in the database (S26).

Furthermore, for the purpose of maintaining the compatibility of the data entered simultaneously from plural terminals, the data-writing processing module 20 includes a simultaneous-executions control means 20b (simultaneous-executions control program) for performing exclusive control of each execution unit.

The database groups 41, 42, 43, and so on are divided into a group of master tables and a data-table group. The group of master tables comprises at least tables for a company's basic list of master files, a master list of account titles, a master list of customers, a master list of merchandise, and a master list of personnel, a master list of management personnel, and the like. The data-table group comprises tables of information relating to various slips such as journal vouchers, sales slips, purchase slips, price quotes, contracts, and purchase orders for product-component materials.

Also, tasks program 11 relating to sales/purchases tasks processes a variety of slips relating to sales, orders received, payments for orders, purchases, orders placed, payment for purchases, production, transfers from warehouses for deliveries, and so on. The slip data comprises a head part and a details part, such that data conditions can be customized or not customized in four ways: (1) both the head part and the details part are customized; (2) only the head part is customized; (3) only the details part is customized; and (4) neither the head part nor the details part is customized. A corresponding data-writing processing functions group 20a is created for each of these four alternatives.

Because the data-writing processing functions group 20a is installed in a DLL file, the use of the application produced by using that file prevents unnecessary operations, thereby increasing the speed of data entry/processing.

Next, a detailed embodiment of the data-writing processing functions group 20a as shown in FIG. 4 will be described.

FIG. 4 and FIG. 5 show embodiments of the data-writing processing functions group 20a relating to the aforementioned sales slips in the sales/purchases-tasks program 11.

FIG. 4 shows a new-sales-slip registering-functions group (a) in the sales-slip-writing functions group 20a in a case of new registration into the database 41.

As described above, because the sales slip is divided into a head part and a details part, it includes a functions group that consists of the four categories of customized/noncustomized conditions. Each argument is different, corresponding to the condition. In addition, separate functions groups are provided for relay slips, which relay data from received-order slips to sales slips, and for a sales slip other than a normal slip, such as a consumer-tax slip in the case of a sale that is subject to a consumption tax or sales tax.

FIG. 5 shows a sales-slip revision-registering functions group (b) and a sales-slip-deleting functions group (c).

FIG. 6 shows slip-head data (A) and (that are B) required for the registration of a new sales slip and for revision of an already registered sales slip. The data is designed to be designated in an argument (3), as shown in the Factor List on FIG. 4 (2).

The slip-head data (A) in FIG. 6 is entered only at the time of registering a new sales slip. A system number, a slip number, and other data become identification characters for determining into which tables the data, including customized data, is to be entered.

FIG. 7 shows a sales-slip's detailed data (C) that is designed to be assigned to the slip-head data of FIG. 6, which is designated in Factor (7).

The detailed data (C) is entered in a form that is to be repeated in each line of detailed data.

FIG. 8 shows how an application program for database writing is produced using the above writing functions.

In this embodiment, "DO4_ERP_Wrt1" is used for the writing function, and columns are added to both the head and details parts of the sales slip, and a normal slip is used in the new-sales-slip registering function.

Therefore, the arguments are input into all (1–10) arguments of the list of arguments. Also shown in FIG. 8 is a structure for storing data relating to an additional style of the arguments (5) and (9) and a structure for storing information after the data has been designated in the argument (10).

Next, a method of selling said computer-readable recording medium in which basic-tasks programs are recorded 10 using the data-writing processing module 20 will be described.

With this method, when a user-company uses a computer system and requires customization in order to add tables or columns of tables to a database from a terminal, the retailer (1) loads a primary dump file while providing a given file name for that dump file, (2) creates both additional tables for customization as a customizing region in a memory region of the database and additional columns in the original table, (3) accesses the data-writing processing function that corresponds to the customized conditions and any of the new, revision, or deletion conditions in data processing from the data-writing processing functions group by each table of various data entries/processings based on the module, and (4) creates an application program for repeating the entry/processing of the name of a targeted database, a data serial number, an identification number, additional data and the style format thereof to the arguments of the selected data-writing processing function by each table, and for writing the data to the database by batch processing. The application is sold by retailers as an attachment to the computer-readable recording medium in which basic-tasks programs are recorded 10 or the data processing module 20.

In addition, the user-company or its retailer collects the information related to the application program that has been developed by customization, stores that information in a database, and publicizes information about that application program on the software company's Website. As a result, there can be constructed a system whereby that information can be accessed from the database when another user-company wants to customize its software program in a similar way. As a result, the other user-company can reduce its program-development time and also minimize the costs of development.

Figure 3:
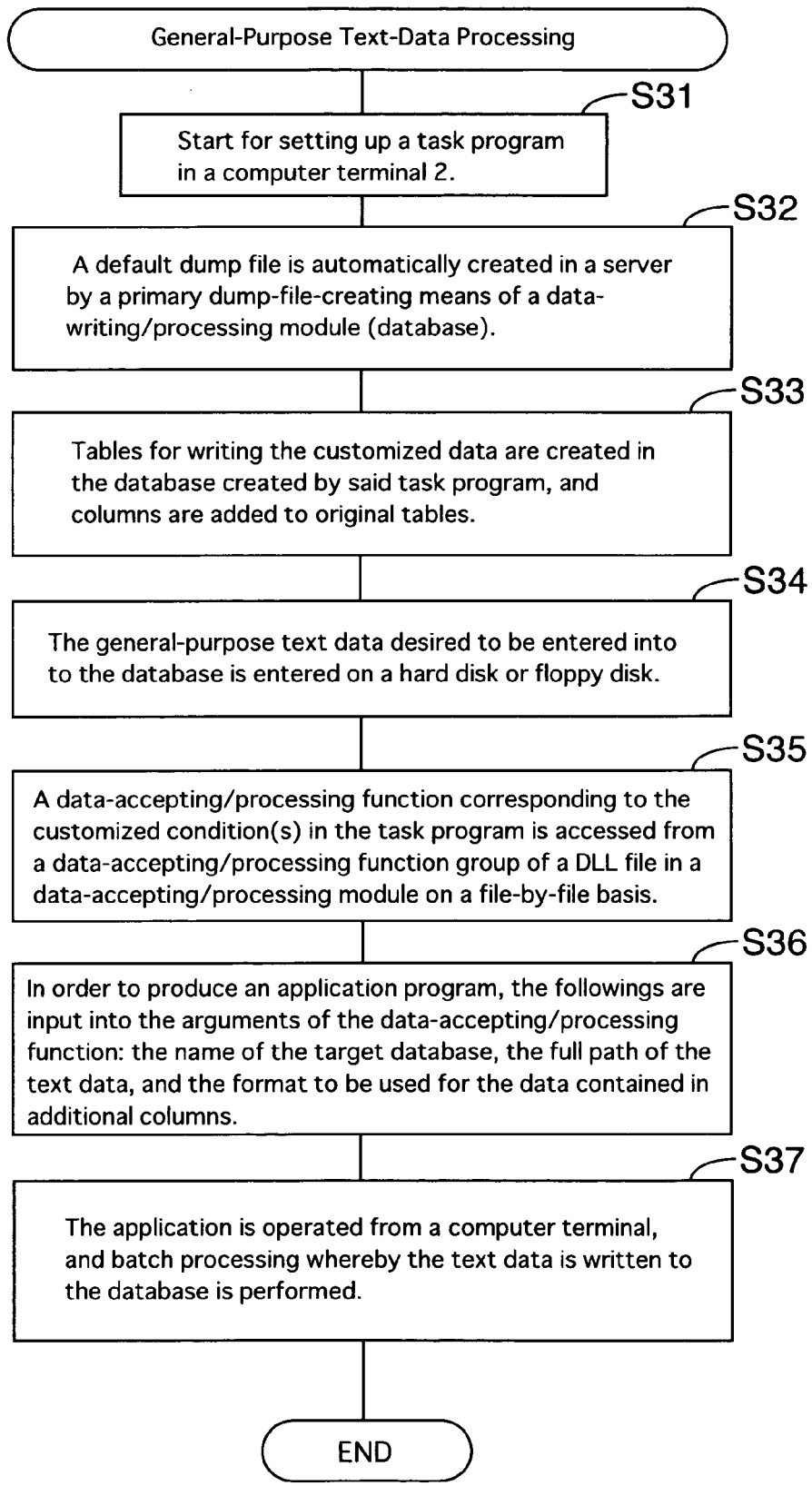
FIG. 3 is a flowchart of general-purpose text-data processing using a module for entering data of the present invention.

Next, the operation of general-purpose text data-writing processing will be described, based on FIG. 3.

As described above, the terminal 2 is equipped with a data-accepting processing module 30 for entry/processing of general-purpose data, namely text data. The operation of data-writing processing will be described below.

First, the task program 11 (12) (13) is installed in the terminal 2 (S31). Next, a default dump file is created under a given filename in a given path of the database-storage processing device 4 in the server computer 6 by the primary dump-file creating means 20c of the of data-writing processing module 20 (S32).

Next, the table 41a (42a) (43a) in the database comprising the default dump file is generated as an original table in a core memory region, and a data-writing processing table 41b (42b) (43b) the database V into which customized data has been written is generated in an region other than its core memory region. Also, customization is performed by adding columns for customized writing to the table for writing when customization is performed in the table 41b (42b) (42c) for writing (S33).

The general-purpose text data that is desired to be entered into the database is entered by the hard-disk drive or floppy-disk drive onto the applicable hard disk or floppy disk 1a (S34).

A data-accepting processing function corresponding to the customized condition(s) in the tasks program 11 (12) (13) is accessed from the data-accepting processing functions group 30a of the DLL file of the data-accepting processing module 30 on a file-by-file basis (S35).

In step S36, the name of the target database, the full path of the text data (which, in this embodiment, is entered on the hard-disk drive or floppy-disk drive 1a), the style format of the additional columns, and other data are input into the arguments of the data-accepting processing function group 30a on a file-by-file basis, so as to create a database-writing application program.

In step S37 the application program is operated from the computer terminal 2 and performs batch processing whereby the text data is written to the database.

As described above, because the data-accepting processing function group 30a corresponding to the customized condition is selected and used in advance of the batch processing, the above-mentioned batch processing can be effectively performed and the data-entry operation can be performed at a high speed.

Next, there will be described a method for selling the aforementioned computer-readable recording medium in which basic-administrative-tasks software programs are recorded 10, or the data-accepting module 30.

With this method, when a user-company uses a computer system and wants to enter general-purpose data into the database from a terminal, the retailer selects the accepting function that corresponds to the customized condition from an accepting-functions group of said data-accepting module 30, creates a batch-processing application program by entering at least the name of the target database and the format of the additional columns when data is being customized, and then tests that application program, which is later is sold via retailers as an attachment to the computer-readable recording medium in which basic task programs are recorded, or the data-writing processing module.

Also, information relating to the application developed as described above is collected and stored in a database, and information regarding the content of that database is publicized on the software company's Website. As a result, there can be created a system whereby another user-company can use the information by accessing it from the database when that company wants to customize the application.

The present invention's computer-readable recording medium in which basic-administrative-tasks software programs are recorded, has the following effects.

1. The basic-administrative-tasks software programs are equipped with a module for writing data that enables data to be entered into a database, and the basic-tasks program can easily customize database tables while maintaining compatibility between the tables. In addition, the data-writing processing can be performed at high velocity.

2. The basic-administrative-tasks software programs can also easily batch process the externally generated general-purpose text data that is entered by the data-accepting processing module, and the basic-tasks program also can easily be customized.

3. A data-writing processing function corresponding to each task program and the customized condition(s) thereof is created for the data-writing processing module, and, as a result, data-writing processing can be efficiently performed.

4. A data-accepting processing function corresponding to each task program and the customized condition(s) thereof is also prepared for the data-accepting processing, and, as a result, data-accepting processing can be effectively performed.

5. When a data-writing processing module or a basic-tasks program for such a module is sold, the retailer creates an application program that meets the user-company's request and that corresponds to the unique customization that is required for the user-company. The retailer can sell that application program as an attachment to the module for writing data or basic-tasks program. This is an effective selling method for the retailer.

6. Similar to Effect 5, when a data-accepting processing module is sold, because the retailer can create an application program that meets the user-company's request or desire and that corresponds to the unique customization that is required for the company and can sell that application program as an attachment to the data-writing processing module, this is an effective selling method for the retailer.

7. Also, if the information relating to customized applications is collected and stored in a database, and if a list of various customized applications is publicized on the software company's Website, another company that uses that type of information can minimize the development time and costs involved in creating a similar customized application program.

EXPLANATION OF NUMBERS IN DRAWINGS 1, 2 computer terminals
1a hard-disk or floppy-disk
4 database-storage processing device
5 local area network (LAN)
6 server computer
10 computer-readable recording medium in which basic-administrative-tasks software programs are recorded
11 sales/purchases-tasks program
12 financial accounting-tasks program
13 worktime/wages-related tasks program
20 data-writing processing module
20a data-writing processing functions group
20b simultaneous-executions limiting means
20c primary dump-file creating means
30 data-accepting processing module
30a data-accepting processing functions group
41 sales/purchases-management database
41a, 41b, and so on tables
42 financial-accounting database
42a, 42b, and so on tables
43 worktime/wages-related database
43a, 43b, and so on tables
61 database-device control program
100 computer system (basic-tasks processing device)

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-readable recording medium in which basic-tasks programs are installed and operated in plural terminal computers of a computer system, wherein the basic-tasks programs operate on databases having tables and wherein the computer system includes plural terminal computers for processing basic-administrative-tasks, and a database device that stores company resource data required for tasks and is controlled by a database server computer, said computer-readable recording medium, comprising:
   a data-writing processing module for recording;
   a Dynamic Link Library (DLL) file, which stores a data-writing processing function group that corresponds to each table of a database which is recorded by one of said basic-tasks programs in order to create a database-writing application program that can correspond to either a condition that is customized to each table of the basic-tasks program or a condition that is not customized to each table of said basic-tasks program at the time of data entry where data are entered into the table of a database with the basic-tasks program that are installed in said terminal computers;
   a program file means for creating a primary dump file, in which a current table is automatically created when the basic-tasks programs are set up and for automatically creating a default dump file that includes all the information on the database related to tasks under a given filename in a given path of said server computer when said basic-tasks programs are set up in one of said terminal computers;
   a data-writing processing function group means for classifying, said data-writing processing function group means having tables of said database classified according to at least two kinds of conditions, the first condition in which either customized writing is done or not, and the second condition in which the type of data entry is either new writing, revision, or deletion when a writing process of said basic-task programs is executed per each table of said database, said tables being then stored in the DLL file according to each possible combination of said first and second conditions;
   wherein said data-writing processing function group has respective arguments in which at least a target database name, data to be entered, a serial number, and an identification number are entered, wherein items to be entered, are given to the arguments of customized functions and when a function that corresponds to each table of said database is called up and required task processing data are set as entry items to the arguments, data are written by said data-writing processing function group onto a target table specified in the arguments.

2. A computer-readable recording medium in which basic-administrative-tasks software programs are recorded according to claim 1, wherein,
   said computer terminals are plural and said module for writing data for maintaining compatibility of the entered/processed data simultaneously includes a simultaneous-executions control program for performing exclusive control of each execution unit.

3. The computer-readable recording medium in which basic-administrative-tasks software programs are recorded according to claim 2 wherein, said basic tasks include at least one of the following: accounting tasks, sales/purchases-related tasks, and worktime/wages-related tasks.

4. A computer-readable recording medium in which basic-administrative-tasks software programs are recorded according to claim 1, wherein,
   said basic tasks include at least one of the following: accounting tasks, sales/purchases-related tasks, and worktime/wages-related tasks.

5. A computer-readable recording medium in which basic-administrative-tasks software programs are recorded according to claim 4, wherein,
   the resource data of the company stored in said database group comprises
   at least a group of master tables and
   a group of data tables that are required for executing any of said three administrative tasks: accounting tasks, sales/purchases-related tasks, and worktime/wages-related tasks,
   said group of master tables comprises at least any of the following tables for a company's basic list of master files: a master list of account titles, a master list of customers, a master list of merchandise, and a master list of personnel;
   and said data-table group comprises at least tables for a variety of slip data, such as data from accounting-journal slips, sales slips, and purchase slips.

6. A computer-readable recording medium in which basic-tasks programs are recorded according to claim 1, wherein:

a default dump file is created by said means for creating a primary dump file as an original table under a given filename in a given path when programs recorded in said computer-readable recording medium are installed onto said terminal computer, and a basic-tasks program into which data-writing processing is to be done is set up;

columns are added to an original table that includes the default dump file, or new tables are created when customization is desired;

the data-writing processing function that corresponds to the above-mentioned classification per each table of the basic-tasks program is called up from the data-writing processing function group of said DLL file;

a data-writing processing application program that can enter sequential data for each table unit by batch processing is created, using a series of data-writing processing functions, to the arguments of which required basic-tasks processing data are entered respectively; and that the data-writing processing application program is operated by said terminal computer, so that data of the original column data of the customized column in case of a customized table are sequentially written onto each table, and that the basic-tasks programs are processed.

7. A computer-readable recording medium in which basic-administrative-tasks software programs are recorded, comprising:

a plurality of said basic-administrative-tasks software programs having a database having tables;

a data-writing processing module;

a data-accepting processing module that stores a data-accepting processing function group which corresponds to each table of said basic-administrative-tasks software programs in a DLL file, in order to create a database-writing application program that compatibly operates under both customized and uncustomized conditions for every table of said basic-administrative tasks software programs database when external general-purpose data are read from the outside of a terminal computer and read/accepted into a table of said database, using the basic-administrative-tasks software programs that are installed onto the terminal computer;

wherein said data-accepting processing function group is classified according to whether general-purpose data has at least additional customized columns or not which the data accepting processing module stores in the DLL file, when the data is accepted from the outside of the said basic-administrative tasks software programs for every table of said database; and wherein each function group has arguments, which have at least the following entry items: a target database name, a full path to a text file of the external general-purpose data, a target full path where a log file is to be created, a serial number, an identification number, and created entry item for the format of additional columns in case the data of the text file have additional columns;

an application that writes the data onto a writing target table, from the general-purpose text file, using said data-accepting function group by batch processing can be created, if the function corresponding to each table of the general-purpose data is called up, and the required basic-tasks processing data are set into the entry items of the arguments, and when accepting said external general-purpose data in said target table, the data are first set into a hard-disk drive or a floppy-disk drive of the terminal computer, into which basic-administrative-tasks software programs recorded in said computer-readable recording medium are installed.

8. A method of processing recorded administrative-tasks using basic-tasks programs installed and operated in plural terminal computers of a computer system for processing basic-administrative-tasks, and a database device that stores company resource data required for the tasks and is controlled by a database server computer, the method comprising the steps of:

storing a Dynamic Link Library (DLL) file, which stores a data-writing processing function group that corresponds to each table of a database with said basic-tasks programs in order to create a database-writing application program that can correspond to either a condition that is customized for every table of the basic-tasks programs using data-writing processing functions or a condition that is not customized for every table of said basic-tasks programs at the time of data entry process where data are entered into the table of a database with said basic-tasks programs that are installed in terminal computers;

creating a primary dump file, in which a current table is automatically created when said basic-tasks programs are set up;

creating a default dump file that includes all the information on the database with said basic-tasks programs related to the tasks under a given filename in a given path of said server computer when said basic-tasks programs are set up in one of said terminal computers;

classifying the tables of said database into at least two conditions, a first condition in which either customized writing is done or not, and a second condition in which the type of data entry is either new record, revision, or deletion at the time of writing process of said basic-tasks programs executed per each table, the tables being then stored in the DLL according to each possible combination of said two conditions;

each said data-writing processing function group has respective arguments in which at least a target database name, data to be entered, a serial number, and an identification number are entered, wherein items to be entered are given to the arguments of said customized data-writing processing functions, and when a function that corresponds to each table of a database with said basic-tasks programs is called up and required task processing data are set as entry items to the arguments, data are written by said function onto a target table specified in the arguments;

creating a said default dump file as an original table under a given filename in a given path when programs recorded are installed onto the terminal computer, and said basic-tasks programs into which data-writing processing is to be done is set up;

adding columns or new table to an original table of said default dump file when customization is desired;

calling up the data-writing processing function that corresponds to the above-mentioned classification per each table of the said basic-tasks programs from the data-writing processing function group of the DLL file;

entering sequential data for every table of a database of said basic-tasks programs by which batch processing is created, using a series of data-writing processing functions to the arguments of which required basic-tasks processing data are entered respectively; and operating the data-writing processing application program by the terminal computer, so that data of the original column of table and data of the customized column in case of a customized table are sequentially written onto each table, and that the said basic-tasks programs are processed.

9. A method of recording administrative-tasks, comprising the steps of:

creating a database-writing application program including a database having tables, wherein the database-writing application program compatibly operates under both customized and uncustomized conditions for each table of the basic tasks program when general-purpose data are read from the outside of a terminal computer and accepted into a table of a database, using the basic tasks programs that are installed onto a terminal computer;

classifying a data-accepting processing function group according to whether each table of said database-writing application program for writing a text file of an external general-purpose data has at least additional customized columns or not and stored in a DLL file, when the data is accepted from the outside of the database-writing application program for every table unit of said database;

wherein said data-accepting processing function group has arguments, which have at least the following entry items; a target database name, a full path to a text file of the external general-purpose data, a target full path where a log file is to be created, a serial number, and an identification number as well as an entry item for the format of said additional columns when the data of the text file have additional columns, writing the data onto a writing target table, from the general-purpose text file, using said data-accepting processing function by batch processing, if the function corresponding to each table of the database of said database-writing application is called up, and the required basic-tasks processing data are set into the entry items of the arguments;

accepting said external general-purpose text data in the database of said database-writing application, the data are first set into a hard-disk drive or a floppy-disk drive of the terminal computer, into which basic-task programs recorded;

calling up a data-accepting processing function corresponding to said customized and uncustomized condition of the basic-tasks program for each table from the data-accepting processing function group of said DLL file, using the terminal computer;

sequentially accepting the data for each table unit by batch processing using a series of the data-accepting processing functions, to the arguments of which required basic-tasks processing data are entered respectively; and operating by said terminal computer, so that the data is sequentially accepted and written via the data-accepting processing function from the hard-disk drive or the floppy-disk drive that records the external general-purpose text data, into which the data of an original column and the data of a customized column of said writing target database are set per each table.

* * * * *